April 11, 1950

R. O'LEARY 2,504,039

OPTICAL INSTRUMENT HAVING ADJUSTABLE
FLUID PRISM MEANS

Filed May 1, 1946

INVENTOR.
Russell O'Leary.

BY Victor J. Evans & Co.

ATTORNEYS

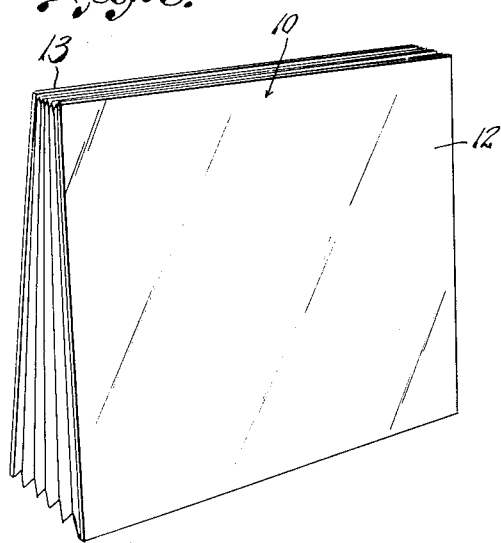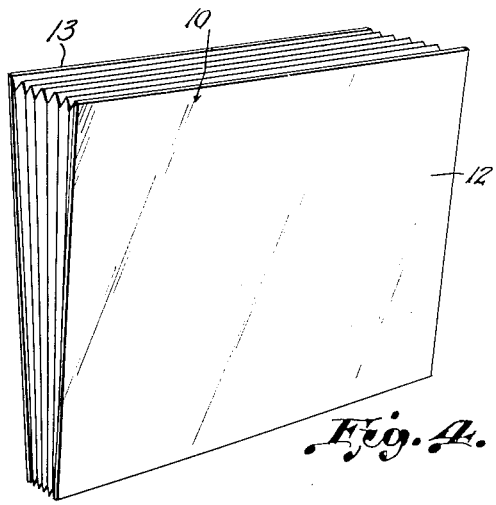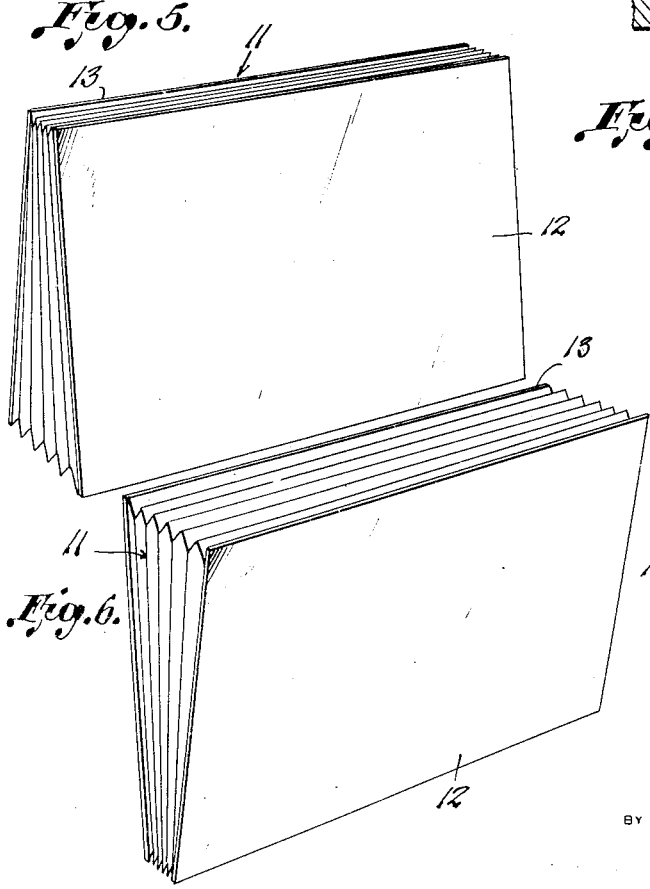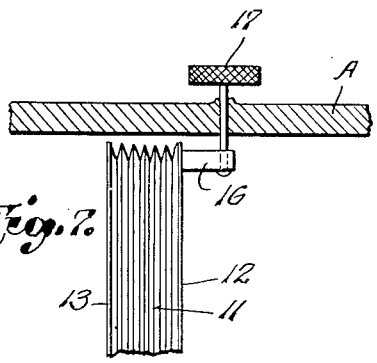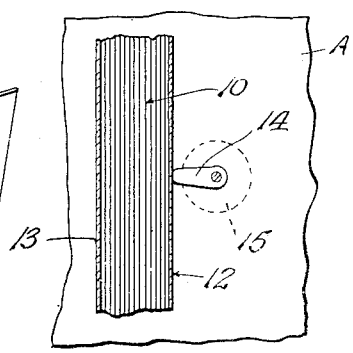

Patented Apr. 11, 1950

2,504,039

UNITED STATES PATENT OFFICE 2,504,039

OPTICAL INSTRUMENT HAVING ADJUSTABLE FLUID PRISM MEANS

Russell O'Leary, Wheeling, W. Va.

Application May 1, 1946, Serial No. 666,360

1 Claim. (Cl. 88—1)

The invention relates to a movable prism mount for controlled mechanical compensation for natural refraction to produce an apparent tri-dimensional effect in optical instruments.

The primary object of the invention is the provision of structure of this character, wherein the four sides of variable prisms may be adjusted within the camera proper, thereby enabling the production of apparent three dimensional pictures, the structure being novel in assembly and unique in the arrangement of its parts.

Another object of the invention is the provision of a structure of this character, wherein the same has numerous uses, as it may be employed in telescopes, gunsights, and in fact in most all optical equipment, as a controlled mechanical compensation for natural refraction to produce apparent tri-dimension effect.

A further object of the invention is the provision of a structure of this character, which is simple, thoroughly reliable and efficient in operation, strong, durable, readily and easily operated, adaptable for various uses, possessed of few parts and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 3 is a perspective view of one variable prism section in one adjusted position.

Figure 4 is a view similar to Figure 3, showing another adjusted position of the prism section.

Figures 5 and 6 are views similar to Figure 4 showing further adjusted positions of the prism section.

Figure 7 is a fragmentary sectional view taken on the line 7—7 of Figure 1 looking in the direction of the arrows.

Figure 8 is a fragmentary sectional view taken on the line 8—8 of Figure 1 looking in the direction of the arrows.

Similar reference characters indicate corresponding parts throughout the several views in the drawings.

Figure 1:
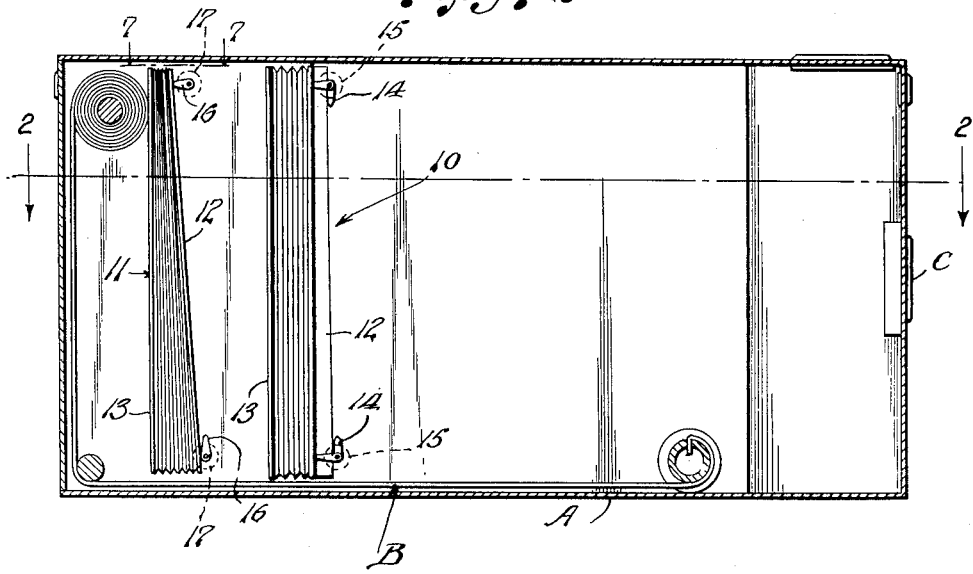
Figure 1 is a vertical longitudinal sectional view through a camera box, showing the structure in accordance with the invention applied thereto.
Figure 2:
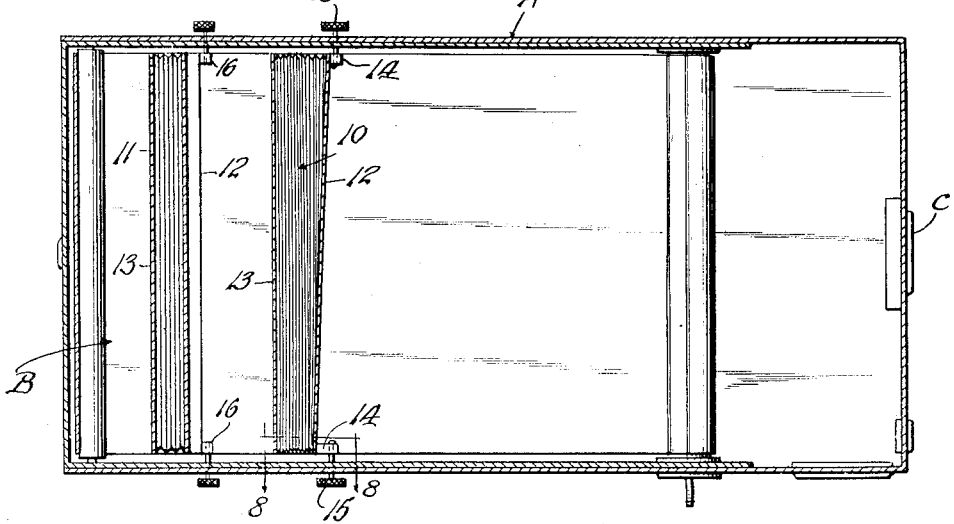
Figure 2 is a sectional view taken on the line 2—2 of Figure 1 looking in the direction of the arrows.

Referring to the drawings in detail, A designates generally a portion of a camera box or housing, which may be of any ordinary kind, it being shown for mere illustrative purposes, and B denotes the film and adjunct mounting thereof, while C is the light opening in such box or housing.

Within the box or housing A in the path of travel of the film B therein are arranged fore and aft spaced hollow bellows-like adjustable prism sections 10 and 11 respectively, each including an adjustable frontal transparent panel 12 and a stationary aft transparent panel 13, the stationary panel 12 being fixed within the box or housing in any suitable manner, while the bellows-like section is expansible and retractible.

In the present instance, the front panel 12 of the section 10 has a horizontal hinge action in a vertical direction and this is effected by turning cams 14, manually operated by finger knobs 15 exposed exteriorly of the box or housing A, while the panel 12 of the section 11 has a vertical hinge action in a horizontal direction and this being effected by turning cams 16 manually operated by finger knobs 17 exposed exteriorly of the said box or housing, to produce different views of apparent three dimensional pictures in the use of the camera.

The bellows-like sections 10 and 11, and the panels 12 and 13, each is built as a single unit, yet this construction may be varied from, optionally.

The bellows-like sections 10 and 11 are to be filled with a gas or suitable liquid of a refractive nature, the cams being active on the movable panels 12 and 13 of such sections for the extending or contracting thereof.

From the foregoing it is thought that the construction and manner of operation of the structure will be clearly understood, and therefore, a more extended explanation has been omitted for the sake of brevity. Changes, variations and modifications may be resorted to as fall properly within the scope of the appended claim, without departing from the spirit of the invention or sacrificing any of its advantages and such is contemplated within the scope of such invention.

What is claimed is:

An optical instrument comprising an enclosure having a light passage therethrough, a pair of bellows-like prisms intersecting the light passage and each having stationary and movable transparent panels, a refractive fluid enclosed in said prisms and manually operative means including a pair of shafts mounted in the instrument having a finger knob on each shaft exteriorly of the enclosure for rotation of the shafts and a cam on each shaft interiorly of the instrument for engaging each of the movable transparent panels for adjusting the movable panels independently of each other whereby distorted images may be produced.

RUSSELL O'LEARY.

REFERENCES CITED

The following references are of record in the file of this patent:

UNITED STATES PATENTS

| Number | Name | Date |
|---|---|---|
| 504,890 | Ohmart | Sept. 12, 1893 |
| 634,560 | Lumiere | Oct. 10, 1899 |
| 740,484 | Stocum | Oct. 6, 1903 |
| 757,900 | Englund | Apr. 19, 1904 |
| 1,003,064 | Phillips | Sept. 12, 1911 |
| 1,195,757 | Wertz | Aug. 22, 1916 |
| 1,307,598 | Phillips | June 24, 1919 |
| 2,256,133 | Barnes | Sept. 16, 1941 |
| 2,300,251 | Flint | Oct. 27, 1942 |